United States Patent
Nakasaka

(10) Patent No.: US 10,125,697 B2
(45) Date of Patent: Nov. 13, 2018

(54) CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventor: Yukihiro Nakasaka, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 45 days.

(21) Appl. No.: 15/596,029

(22) Filed: May 16, 2017

(65) Prior Publication Data
US 2018/0016994 A1 Jan. 18, 2018

(30) Foreign Application Priority Data
Jul. 12, 2016 (JP) .................................. 2016-137546

(51) Int. Cl.
*F01L 1/34* (2006.01)
*F02D 13/02* (2006.01)
*F01L 1/02* (2006.01)
*F01L 1/344* (2006.01)

(52) U.S. Cl.
CPC ............ *F02D 13/0238* (2013.01); *F01L 1/02* (2013.01); *F02D 13/02* (2013.01); *F01L 1/3442* (2013.01); *F01L 2800/03* (2013.01)

(58) Field of Classification Search
CPC ....... F01L 1/02; F01L 1/3442; F01L 2800/03; F02D 13/02; F02D 13/0238
USPC ............................................. 123/90.15, 90.17
See application file for complete search history.

(56) References Cited

U.S. PATENT DOCUMENTS 7,584,729 B2 * 9/2009 Tanaka .................... F01L 1/352
123/90.15

FOREIGN PATENT DOCUMENTS

JP          2008-025383 A       2/2008

* cited by examiner

*Primary Examiner* — Ching Chang
(74) *Attorney, Agent, or Firm* — Hunton Andrews Kurth LLP

(57) ABSTRACT

A control system for an internal combustion engine is provided with a crankshaft, an intake camshaft with an intake cam, a timing chain, an intake variable valve timing mechanism configured to be able to change at least one of an opening timing and closing timing of an intake valve by controlling a phase of the intake cam, and an electronic control unit configured to set in advance a periodic correction coefficient to vibrate by a period identical to a rotational period of the timing chain and to control the intake variable valve timing mechanism by the periodic correction coefficient to make the phase of the intake cam a target phase.

9 Claims, 11 Drawing Sheets

FIG. 1
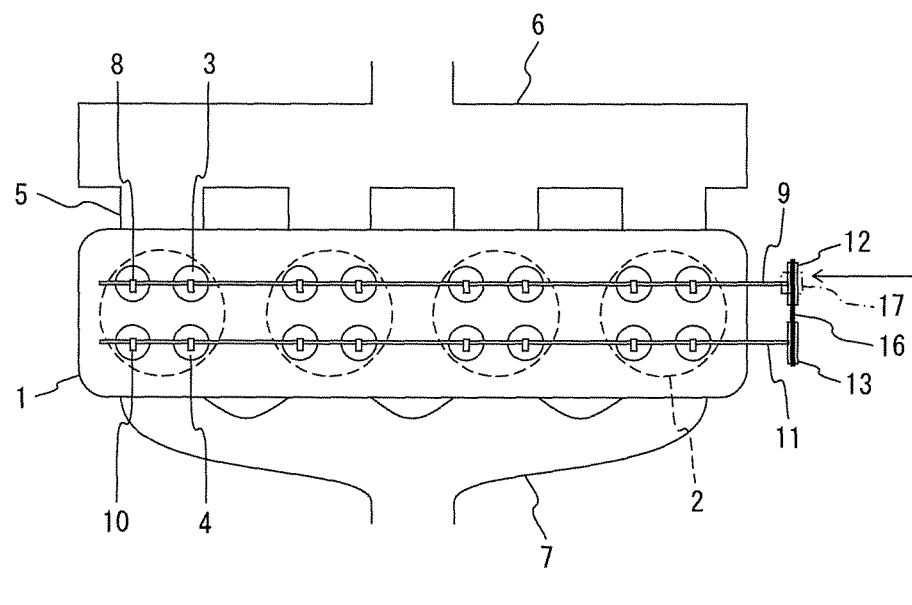
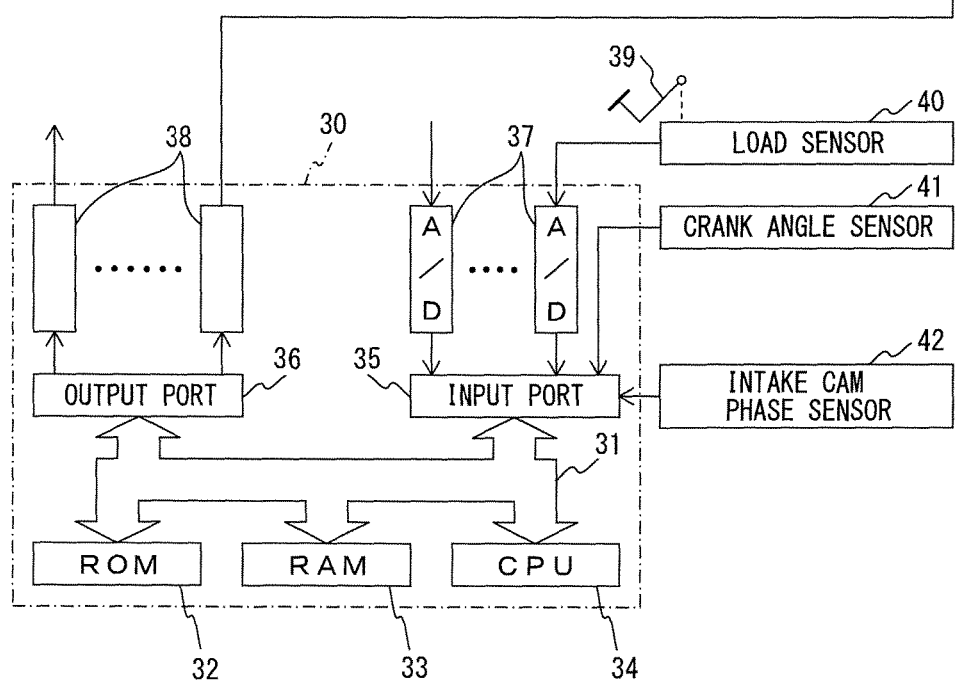

CONTROL SYSTEM FOR INTERNAL COMBUSTION ENGINE

BACKGROUND OF THE INVENTION

Technical Field

1. Field of the Invention

The present disclosure relates to a control system for an internal combustion engine.

Background Art

2. Related Art

A control system for an internal combustion engine including a crankshaft, an intake camshaft provided with an intake cam for driving an intake valve to open and close the intake valve, a timing chain for transmitting rotation of the crankshaft to the intake camshaft, and an intake variable valve timing mechanism configured to be able to change an opening timing and closing timing of the intake valve by controlling a phase of the intake cam and controlling the intake variable valve timing mechanism to make the phase of the intake cam a target phase is known in the art(for example, see Japanese Patent Publication No. 2008-025383A). While not clearly stated in Japanese Patent Publication No. 2008-025383A, in general, the timing chain is provided with a plurality of outer links and a plurality of inner links and a plurality of pins connecting these outer links and inner links with each other, and teeth of a sprocket engage with engagement spaces formed between the pins.

SUMMARY OF THE INVENTION

In this regard, intervals between the pins of the timing chain, that is, lengths of the engagement spaces, are not necessarily constant. Specifically, referring to a length of a part of the timing chain per constant number of the engagement spaces as a chain part length, there may be a case where the chain part length is relatively longer at a certain part of the timing chain and the chain part length is relatively shorter at the remaining part of the timing chain. In other words, there may be a case where the timing chain includes a longer part with a relatively longer chain part length and a shorter part with a relatively shorter chain part length.

Assuming that a region in which the timing chain proceeds can be divided into a downstream region where the timing chain heads from the intake camshaft to the crankshaft and an upstream region where the timing chain heads from the crankshaft to the intake camshaft, when the above-mentioned longer part proceeds through the downstream region, the longer part limits rotation of the intake camshaft, so the phase of the intake cam is made retarded with respect to the target phase. Conversely, when the longer part proceeds through the upstream region, the longer part enhances rotation of the intake camshaft, so the phase of the intake cam is advanced with respect to the target phase. Whatever the case, there is a problem that the phase of the intake cam may deviate from the target phase. If the phase of the intake cam deviates from the target phase, the opening timing and closing timing of the intake valve may deviate from respective targeted timings and an amount of intake air may deviate from a targeted amount. Therefore, an engine output may deviate from a targeted value.

Solution to Problem

According to the present disclosure, there is provided a control system for an internal combustion engine comprising: a crankshaft; a camshaft provided with a cam for driving an engine valve to open and close the engine valve; a timing chain for transmitting rotation of the crankshaft to the camshaft; a variable valve timing mechanism configured to be able to change at least one of an opening timing and closing timing of the engine valve by controlling a phase of the cam; and an electronic control unit configured to set in advance a periodic correction coefficient to vibrate by a period identical to a rotational period of the timing chain and to control the variable valve timing mechanism by the periodic correction coefficient to make the phase of the cam a target phase.

According to the present disclosure, there is provided a method of controlling an internal combustion engine, the engine including: a crankshaft; a camshaft provided with a cam for driving an engine valve to open and close the engine valve; a timing chain for transmitting rotation of the crankshaft to the camshaft; a variable valve timing mechanism configured to be able to change at least one of an opening timing and closing timing of the engine valve by controlling a phase of the cam; and an electronic control unit, the method comprising: setting in advance using the electronic control unit a periodic correction coefficient to vibrate by a period identical to a rotational period of the timing chain, using the electronic control unit; and controlling using the electronic control unit the variable valve timing mechanism by the periodic correction coefficient to make the phase of the cam a target phase.

The present disclosure may be more fully understood from the description of the preferred embodiments according to the present disclosure as set forth below, together with the accompanying drawings.

BRIEF DESCRIPTION OF THE DRAWINGS

In the drawings:

FIG. 1 is an overview of an internal combustion engine.

DESCRIPTION OF THE PREFERRED EMBODIMENTS

Figure 2:
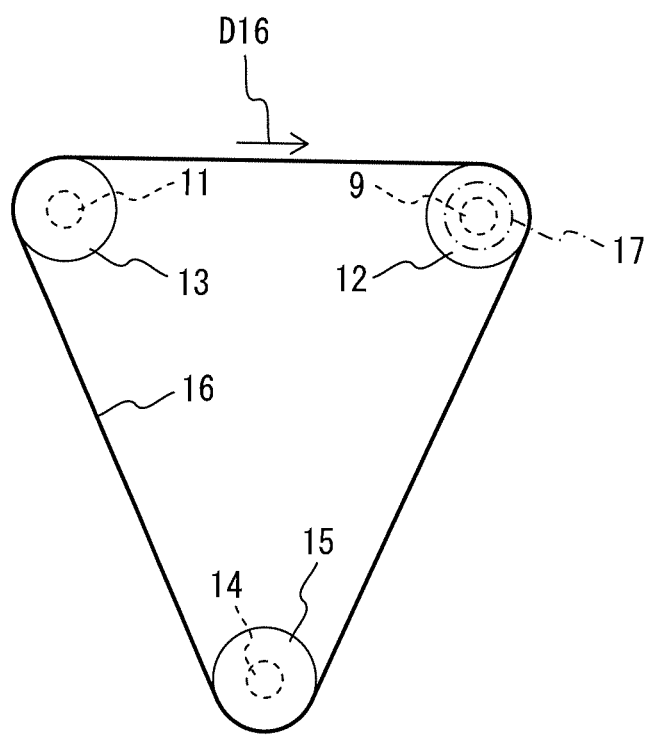
FIG. 2 is a schematic view showing a layout of a crank sprocket, intake sprocket, exhaust sprocket, etc.

Referring to FIG. 1, in an embodiment according to the present disclosure, 1 indicates an engine body of a spark ignition type or compression ignition type, 2 a plurality of cylinders, 3 intake valves, 4 exhaust valves, 5 intake branches, 6 a surge tank, and 7 an exhaust manifold. The intake valves 3 are respectively driven to be opened and closed by corresponding intake cams 8. The intake cams 8 are provided on a common intake camshaft 9. On the other hand, the exhaust valves 4 are respectively driven to be opened and closed by corresponding exhaust cams 10. The exhaust cams 10 are provided on a common exhaust camshaft 11.

Referring to FIG. 1 and FIG. 2, an intake sprocket 12 is attached at one end of the intake camshaft 9. Further, an exhaust sprocket 13 is attached at one end of the exhaust camshaft 11. Further, a crank sprocket 15 is attached at one end of a crankshaft 14 of the engine body 1. A timing chain 16 is wrapped around the intake sprocket 12, exhaust sprocket 13, and crank sprocket 15. As a result, rotation of the crankshaft 14 is transmitted by the timing chain 16 to the intake camshaft 9 and exhaust camshaft 11 to rotate the intake camshaft 9 and exhaust camshaft 11 respectively. Note that, in FIG. 2, an arrow mark D16 shows a direction of progression of the timing chain 16.

Figure 3:
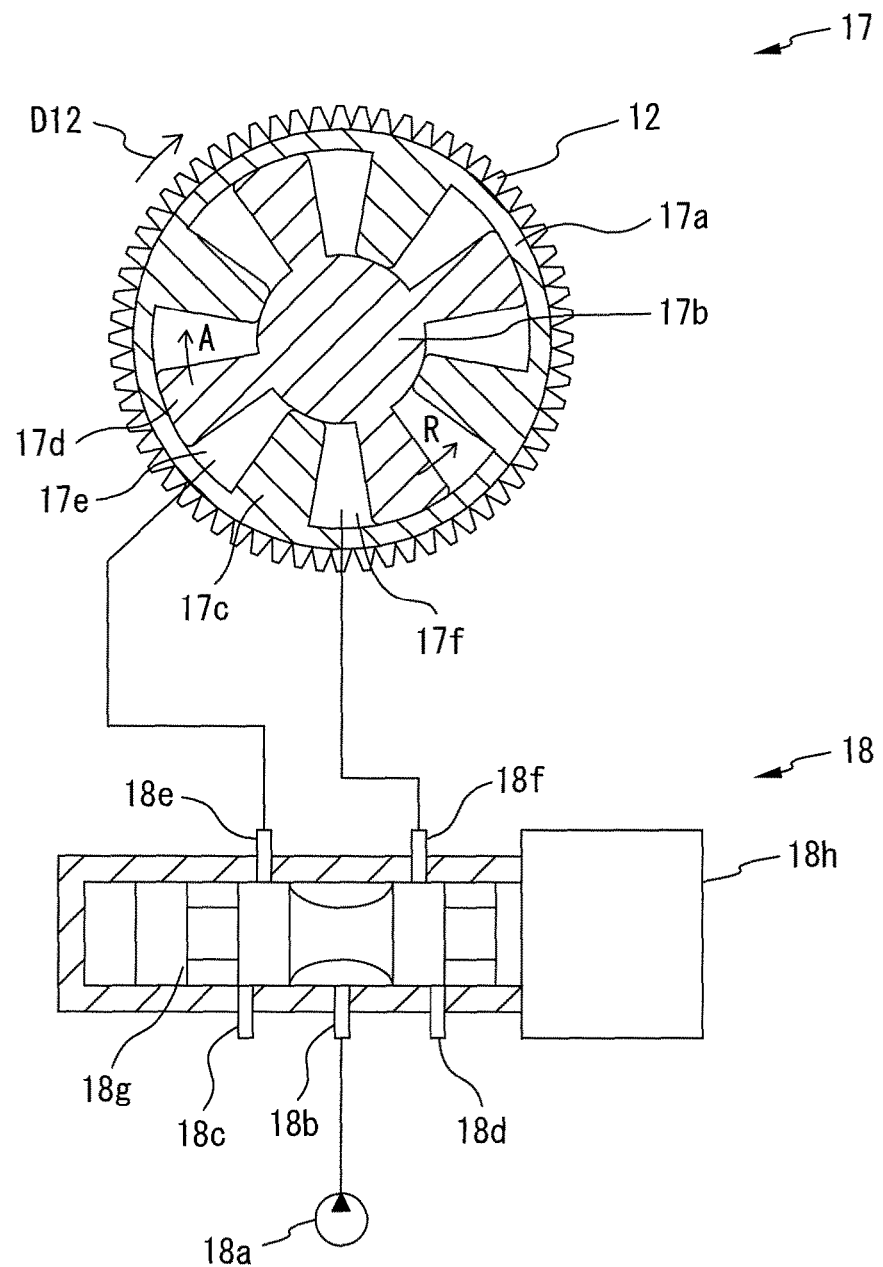
FIG. 3 is a schematic view explaining an intake variable valve timing mechanism.

In the embodiment according to the present disclosure, an intake variable valve timing mechanism 17 configured to enable change of an opening timing and closing timing of the intake valve 3 by control of a phase of the intake cam 8 is provided. Referring to FIG. 3, the intake variable valve timing mechanism 17 of the embodiment according to the present disclosure is provided with a cylindrical housing 17a rotating integrally with the above-mentioned intake sprocket 12, a rotary shaft 17b rotating integrally with the intake camshaft 9 and able to rotate relatively with respect to the cylindrical housing 17a, a plurality of partition walls 17c extending from an inner circumferential surface of the cylindrical housing 17a to an outer circumferential surface of the rotary shaft 17b, vanes 17d extending from the outer circumferential surface of the rotary shaft 17b to the inner circumferential surface of the cylindrical housing 17a between the partition walls 17c, and advancing-use hydraulic chambers 17e and retarding-use hydraulic chambers 17f alternately formed between the partition walls 17c and vanes 17d. Note that, in FIG. 3, an arrow mark D12 indicates the rotational direction of the intake sprocket 12 due to the timing chain 16.

In the embodiment according to the present disclosure, the phase of the intake cam 8 or intake camshaft 9 is controlled by controlling feed of hydraulic fluid to the hydraulic chambers 17e, 17f and discharge of hydraulic fluid from the hydraulic chambers 17e, 17f. The control of feed and discharge of the hydraulic fluid is performed by a hydraulic fluid feed control valve 18. The hydraulic fluid feed control valve 18 is provided with a feed port 18b for hydraulic fluid discharged from a hydraulic pump 18a, a pair of drain ports 18c, 18d, hydraulic ports 18e, 18f respectively connected with the hydraulic chambers 17e, 17f, a spool valve 18g for control of connecting and disconnecting the ports 18b, 18c, 18d, 18e, and 18f, and an actuator 18h such as an electric motor for driving the spool valve 18g.

If the actuator 18h moves the spool valve 18g to the left in FIG. 3 up to an advanced position, the feed port 18b is communicated with the hydraulic port 18e and the hydraulic port 18f is communicated with the drain port 18d. As a result, hydraulic fluid is fed to the advancing-use hydraulic chamber 17e and hydraulic fluid is discharged from the retarding-use hydraulic chamber 17f. Therefore, the rotary shaft 17b rotates relatively with respect to the intake sprocket 12 to an advanced side A. That is, the phase of the intake cam 8 or intake camshaft 9 is advanced. On the other hand, if the actuator 18h moves the spool valve 18g to the right in FIG. 3 up to a retarded position, the feed port 18b is communicated with the hydraulic port 18f and the hydraulic port 18e is communicated with the drain port 18c. As a result, hydraulic fluid is fed to the retarding-use hydraulic chamber 17f and hydraulic fluid is discharged from the advancing-use hydraulic chamber 17e. Therefore, the rotary shaft 17b rotates relative to the intake sprocket 12 to a retarded side R. That is, the phase of the intake cam 8 or intake camshaft 9 is retarded.

Figure 4:
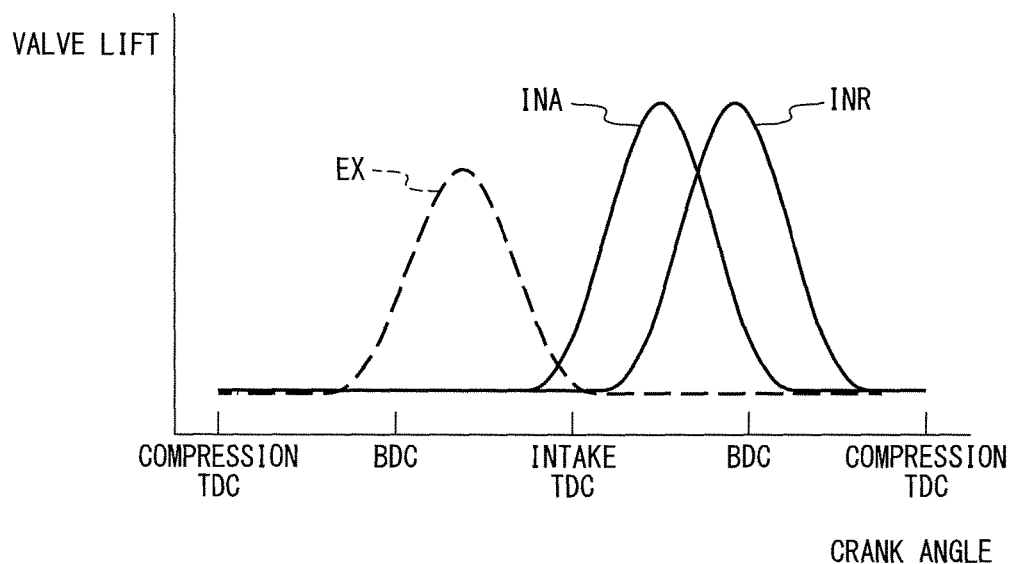
FIG. 4 is a graph showing valve lifts of an intake valve and exhaust valve.

In FIG. 4, a solid line INA shows an amount of intake valve lift when the phase of the intake cam 8 is advanced to the maximum extent by the intake variable valve timing mechanism 17, while a solid line INR shows an amount of intake valve lift when the phase of the intake cam 8 is retarded to the maximum extent. In the embodiment according to the present disclosure, the phase of the intake cam 8 is controlled between the solid line INA and the solid line INR. For example, if the phase of the intake cam 8 is retarded and the closing timing of the intake valve 3 is retarded, an amount of air returned to the surge tank 6 increases and therefore an amount of intake air decreases. As opposed to this, if the phase of the intake cam 8 is advanced and the closing timing of the intake valve 3 is advanced, the amount of air returned to the surge tank 6 decreases and therefore the amount of intake air increases.

Figure 5:
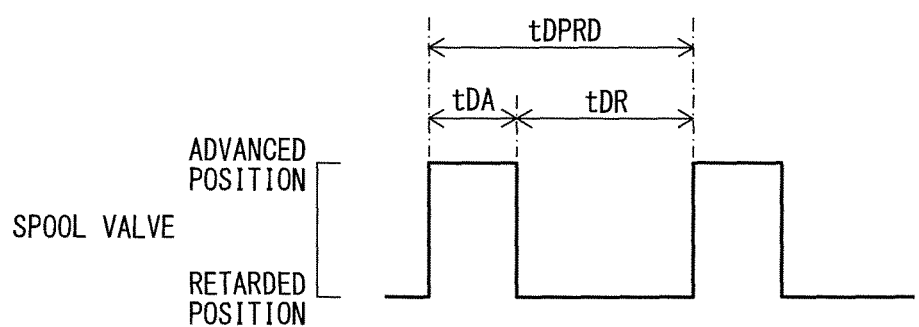
FIG. 5 is a time chart for explaining a duty ratio.

Further, in the embodiment according to the present disclosure, the spool valve 18g, as shown in FIG. 5, is held at an advanced position over an advancing time tDA in a certain periodic time tDPRD and is held at a retarded position over a retarding time tDR. These are repeated. In this case, the phase of the intake cam 8 is controlled by controlling a ratio of the advancing time tDA to the periodic time tDPRD, that is, a duty ratio D (=tDA/tDPRD). If the phase of the intake cam 8 should be advanced, the duty ratio D is increased. That is, the advancing time tDA is lengthened and the retarding time tDR is shortened. As opposed to this, the duty ratio D is decreased if the phase of the intake cam 8 should be retarded. That is, the advancing time tDA is shortened, while the retarding time tDR is lengthened.

Note that, in another embodiment according to the present disclosure (not shown), the intake variable valve timing mechanism 17 is configured to be able to change the closing timing of the intake valve 3 while maintaining the opening timing of the intake valve 3 by controlling the phase of the intake cam 8. In still another embodiment (not shown), the intake variable valve timing mechanism 17 is configured to be able to change the opening timing of the intake valve 3 while maintaining the closing timing of the intake valve 3 by controlling the phase of the intake cam 8. Therefore, if expressed to include these various embodiments, the intake variable valve timing mechanism 17 is configured to be able to change at least one of the opening timing and closing timing of the intake valve 3 by controlling the phase of the intake cam 8.

Figure 6:
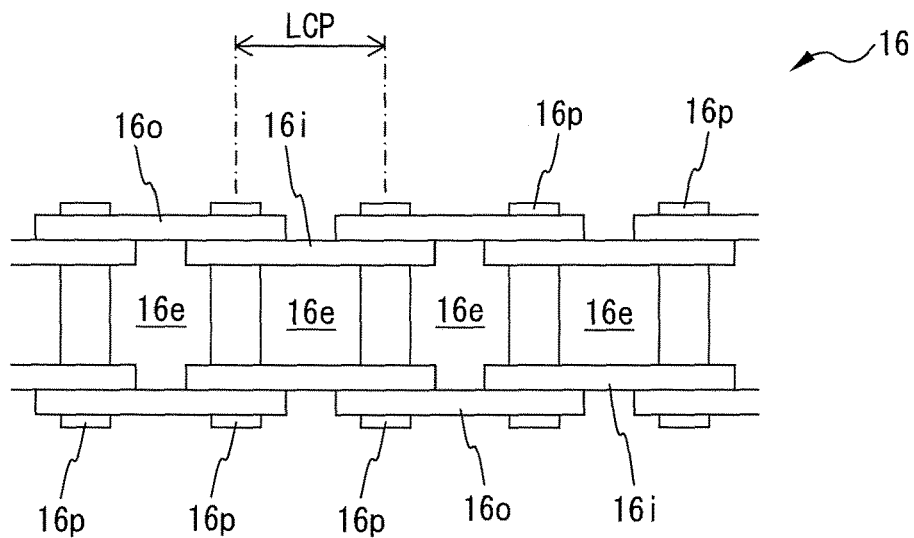
FIG. 6 is a partial schematic enlarged view of a timing chain.

FIG. 6 shows a partial enlarged view of the timing chain 16 of the embodiment according to the present disclosure. Referring to FIG. 6, the timing chain 16 is provided with a plurality of outer links 16o, a plurality of inner links 16i, and a plurality of pins 16p connecting the outer links 16o and inner links 16i with each other. Teeth of the intake sprocket 12 engage with engagement spaces formed between the pins 16p. Note that, in FIG. 6, LCP shows an interval between the mutually adjoining pins 16p, that is, a length of the engagement spaces 16e.

Referring again to FIG. 1, an electronic control unit 30 is comprised of a digital computer and is provided with components connected with each other by a bidirectional bus 31 such as a ROM (read only memory) 32, RAM (random access memory) 33, CPU (microprocessor) 34, input port 35, and output port 36. A load sensor 40 generating an output voltage proportional to an amount of depression of an accelerator pedal 39 is connected to the accelerator pedal 39, while the output voltage of the load sensor 40 is input through a corresponding AD converter 37 to the input port 35. Further, a crank angle sensor 41 which generates an output pulse each time the crankshaft 14 for example rotates by 30 degrees is connected to the input port 35. At the CPU 34, the engine speed is calculated based on the output pulse from the crank angle sensor 41. An intake cam phase sensor 42 which generates an output pulse each time the intake camshaft 9 for example rotates 30 degrees is connected to the input port 35. At the CPU 34, the phase of the intake cam 8 is calculated based on the output pulse from the intake cam phase sensor 42. On the other hand, the output port 36 is connected through corresponding drive circuit 38 to the actuator 18h of the intake variable valve timing mechanism 17.

Figure 7:
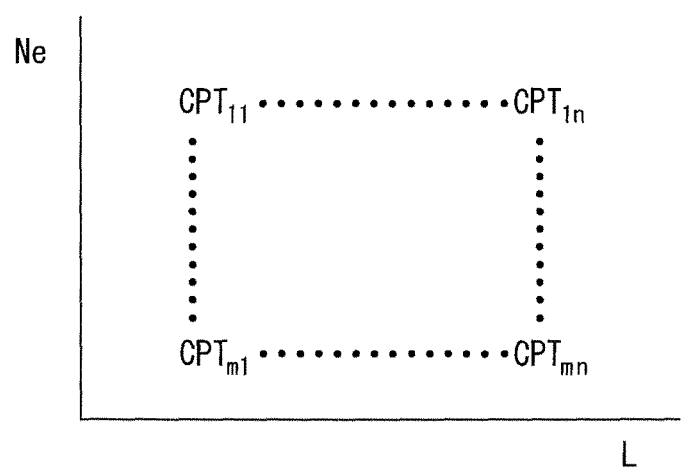
FIG. 7 is a view showing a map of a target phase CPT.

In the embodiment according to the present disclosure, the intake variable valve timing mechanism 17 is controlled to make the phase of the intake cam 8 a target phase. For example, the target phase is a phase of the intake cam 8 required for making the closing timing of the intake valve 3 a target closing timing. The target closing timing is a closing timing of the intake valve 3 required for making an intake air amount a target air amount. The target air amount is an amount of air required for making an engine output a target output. The target phase CPT is stored as a function of the engine operating state, for example, the amount of depression L of the accelerator pedal 39 representing an engine load and the engine speed Ne, in the form of a map shown in FIG. 7 in advance in the ROM 32.

Specifically, a target duty ratio DT corresponding to the target phase CPT is calculated and the hydraulic fluid feed control valve 18 is controlled to make the duty ratio D the target duty ratio DT. The target duty ratio DT is calculated by, for example, the following equation (1). Note that, in equation (1), DB indicates a base duty ratio, kFB a feedback correction coefficient, and kP a periodic correction coefficient.

$$DT=DB+kFB+kP \quad (1)$$

Figure 8:
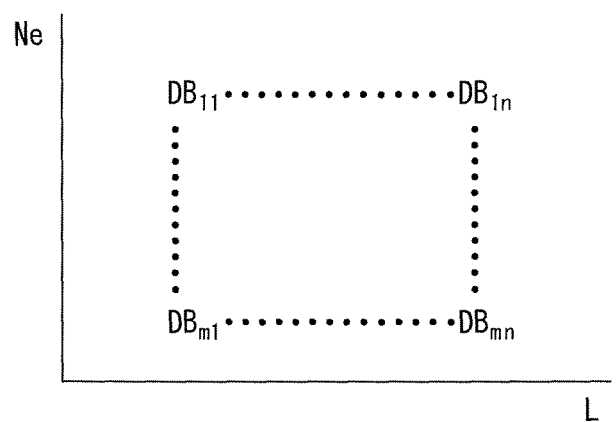
FIG. 8 is a view showing a map of a base duty ratio DB.

The base duty ratio DB is a duty ratio required for making the phase of the intake cam 8 the above-mentioned target phase CPT. The base duty ratio DB is stored as a function of the engine operating state, for example, the amount of depression L of the accelerator pedal 39 representing the engine load and the engine speed Ne, in the form of a map shown in FIG. 8 in advance in the ROM 32.

The feedback correction coefficient kFB is for correcting the phase CP of the intake cam 8 to make an actual phase of the intake cam 8 the target phase CPT, and is made zero if there is no need for correction.

The periodic correction coefficient kP is for correcting the phase CP of the intake cam 8 to make the actual phase of the intake cam 8 the target phase CPT, and is made zero if there is no need for correction. Next, the periodic correction coefficient kP will be further explained.

Figure 9:
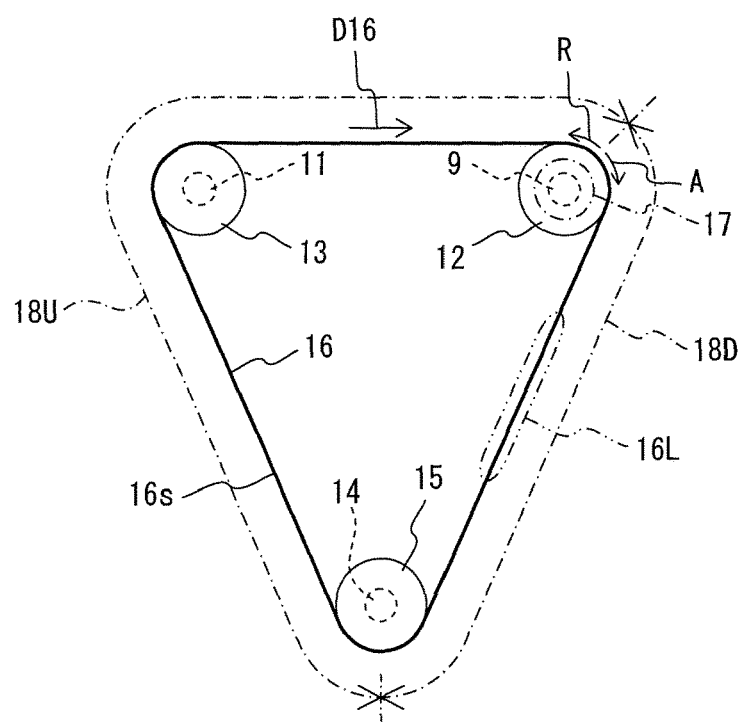
FIG. 9 is a schematic view explaining a longer part and shorter part, etc., of a timing chain.

As explained at the beginning of this specification, the timing chain 16 sometimes includes a longer part and shorter part. In an example shown in FIG. 9, a part surrounded by two-dot chain line in the timing chain 16 is the longer part 16L, and the rest is the shorter part 16s.

On the other hand, the timing chain 16 successively proceeds over the intake sprocket 12, crank sprocket 15, and exhaust sprocket 13. If a region over which the timing chain 16 proceeds can be divided into a downstream region 18D where the timing chain 16 heads from the intake sprocket 12 toward the crank sprocket 15 and an upstream region 18U where the timing chain 16 heads from the crank sprocket 15 toward the intake sprocket 12, when the above-mentioned longer part 16L proceeds through the downstream region 18D, the phase of the intake cam 8 is retarded with respect to the target phase CPT. In other words, a deviation DEV of the phase CP of the intake cam 8 detected by the intake cam phase sensor 42 with respect to the target phase CPT (=CP−CPT) is a negative value. Conversely, when the longer part 16L proceeds through the upstream region 18U, the phase of the intake cam 8 is advanced with respect to the target phase CPT. In other words, the deviation DEV is a positive value. Therefore, considering that the timing chain 16 successively and repeatedly proceeds through the downstream region 18D and upstream region 18U, the deviation DEV vibrates. In this case, the deviation DEV vibrates by a crank angle required for the timing chain 16 to circle around the intake sprocket 12, crank sprocket 15 and exhaust sprocket 13 one time, that is, a rotational period of the timing chain 16.

Figure 10:
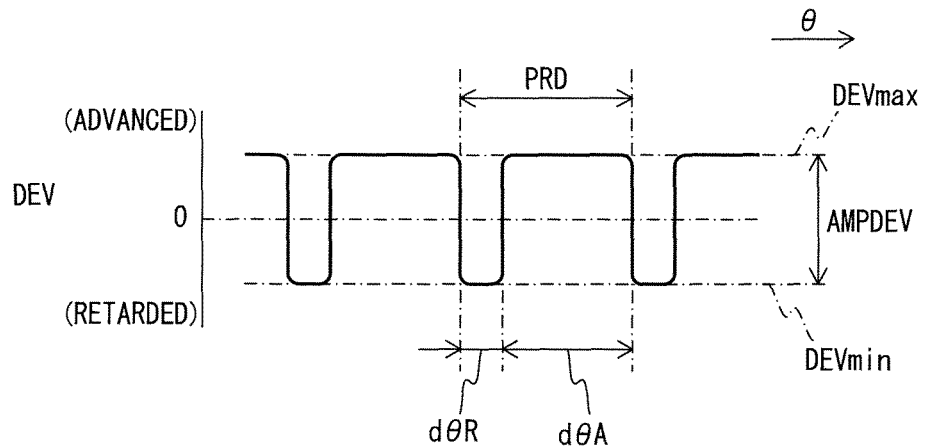
FIG. 10 is a graph showing an example of a change of deviation with respect to a change of crank angle.

FIG. 10 shows an example of change of the deviation DEV with respect to change of the crank angle θ. As shown in FIG. 10, the deviation DEV vibrates between a maximum value DEVmax (>0) and a minimum value DEVmin (<0), that is, by amplitude AMPDEV (=DEVmax−DEVmin), and, further, vibrates by a rotational period PRD of the timing chain 16. In FIG. 10, a crank angle range dθR where the deviation DEV is a negative value corresponds to a time period during which the longer part 16L is proceeding through the downstream region 18D, while a crank angle range dθA where the deviation DEV is a positive value corresponds to a time period during which the longer part 16L is proceeding through the upstream region 18U. Note that a length of the time period dθR, a ratio of the time period dθR and time period dθA, the amplitude AMPDEV, maximum value DEVmax, and minimum value DEVmin of the deviation DEV, etc. may vary in accordance with a length of the longer part 16L, a ratio of the length of the long period 16L and a length of the shorter part 16s, a length of the downstream region 18D, a ratio of the length of the downstream region 18D and a length of the upstream region 18U, etc.

The above-mentioned periodic correction coefficient kP is for making the deviation DEV vibrating by such a rotational period PRD equal to zero. For this purpose, the periodic correction coefficient kP is set in advance to vibrate by the rotational period PRD of the timing chain 16. Next, how to set the periodic correction coefficient kP of the embodiment according to the present disclosure will be explained.

Figure 11:
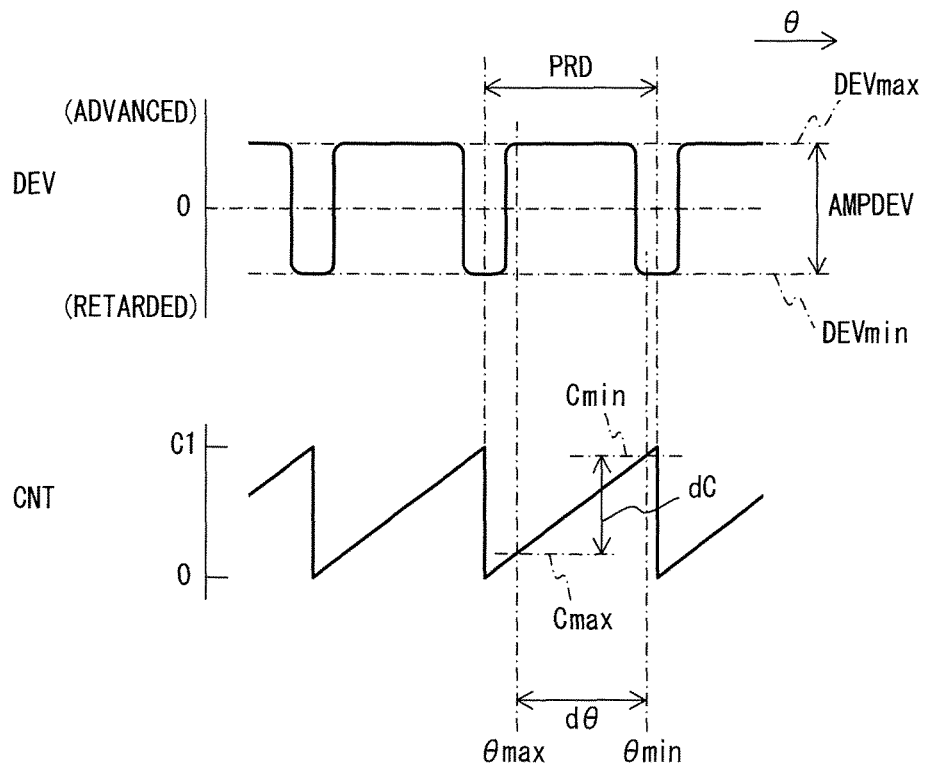
FIG. 11 is a graph showing an example of a change of deviation and change of counter value with respect to a change of crank angle.

FIG. 11 shows one example of the change of the deviation DEV and change of counter value CNT with respect to the change of the crank angle θ. The counter value CNT is counted up each time the crank angle θ rotates by a constant angle and is returned to zero if the counter value CNT reaches a certain value C1. The certain value C1 expresses a counter value CNT required for the timing chain 16 to turn once. Therefore, a crank angle range in which the counter value CNT increases from zero to the certain value C1 expresses the rotational period PRD of the timing chain 16. In the embodiment according to the present disclosure, the maximum value DEVmax and minimum value DEVmin of the deviation DEV in one rotational period PRD are specified. Further, the amplitude AMPDEV of the deviation DEV (=DEVmax−DEVmin) is calculated. Further, the counter value when the deviation DEV becomes the maximum value DEVmax, that is, a maximum counter value Cmax, and the counter value when the deviation DEV becomes the maximum value DEVmax, that is, a minimum counter value Cmin, are specified. Further, an interval dC between the maximum counter value Cmax and the minimum counter value Cmin (=|Cmax−Cmin|) is calculated. In the embodiment according to the present disclosure, such maximum value DEVmax, minimum value DEVmin, and amplitude AMPDEV of deviation DEV, maximum counter value Cmax and minimum counter value Cmin, and interval dC are obtained at a plurality of rotational periods PRD and averaged.

Based on the above, in the embodiment according to the present disclosure, correction by the periodic correction coefficient kP is performed if following four correction conditions stand. The first correction condition is that the amplitude AMPDEV of the deviation DEV be larger than a predetermined amplitude AMPDEV1. The second correction condition is that the interval dC be longer than a predetermined interval dC1. The third correction condition is that the maximum value DEVmax of the deviation DEV be larger than a predetermined advanced side threshold value DEV1A. The fourth correction condition is that the minimum value DEVmin of the deviation DEV be smaller than a predetermined retarded side threshold value DEV1R. On the other hand, if any one of these correction conditions does not stand, correction by the periodic correction coefficient kP is not performed. That is, the periodic correction coefficient kP is made zero. This ensures a reliable correction of the phase of the intake cam 8 while preventing mistaken correction and over correction. In another embodiment (not shown) according to the present disclosure, correction by the periodic correction coefficient kP is performed if at least one of the above-mentioned correction conditions stands, while correction by the periodic correction coefficient kP is not performed if otherwise. In still another embodiment (not shown) according to the present disclosure, the deviation DEV is analyzed by frequency (FFT). If a rotation primary frequency component is larger than a predetermined setting, it is judged that the first correction condition stands.

Figure 12:
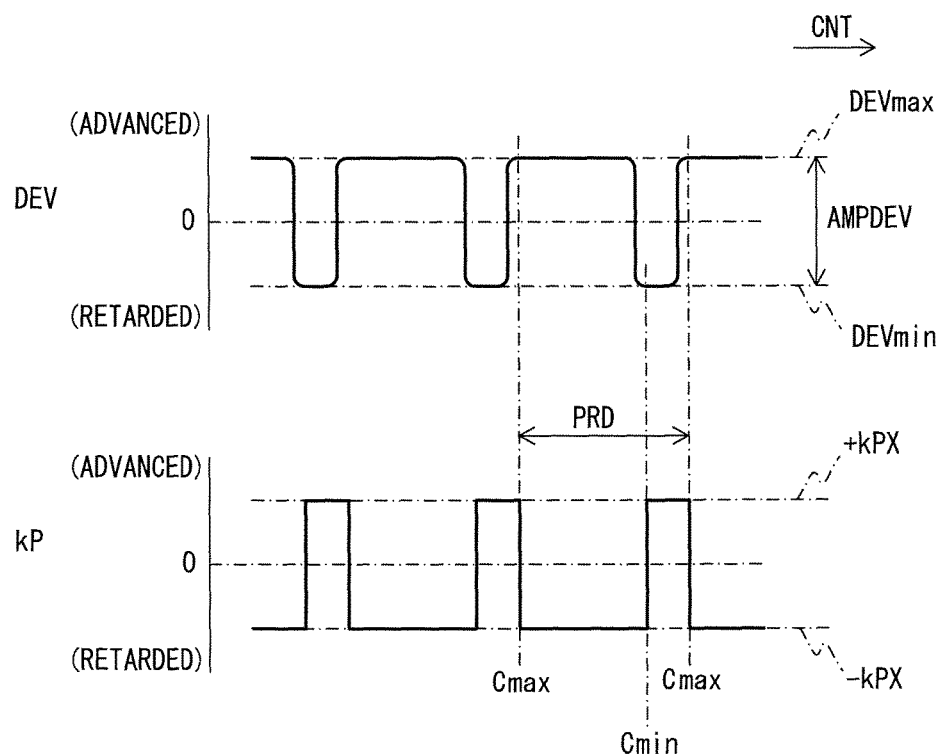
FIG. 12 is graph showing an example of change of a periodic correction coefficient with respect to a change of counter value.

When correction by the periodic correction coefficient kP is performed, the periodic correction coefficient kP is set to vibrate by a period identical to the rotational period PRD of the timing chain 16. FIG. 12 shows one example of change of the periodic correction coefficient kP with respect to change of the counter value CNT when performing correction by the periodic correction coefficient kP. In the example shown in FIG. 12, when the counter value CNT becomes the maximum counter value Cmax, that is, when the deviation DEV becomes the maximum value DEVmax, the periodic correction coefficient kP is made the positive value (kPX) and maintained at the same. Next, when the counter value CNT becomes the minimum counter value Cmin, that is, when the deviation DEV becomes the minimum value DEVmin, the periodic correction coefficient kP is made the negative value (−kPX) and maintained at the same. These are successively repeated. That is, in the example shown in FIG. 12, the electronic control unit 30 is configured to start to correct the phase of the intake cam 8 to a retarded side by the periodic correction coefficient kP at the time (Cmax) when the deviation DEV becomes maximum at the advanced side and to start to correct the phase of the intake cam 8 to the advanced side by the periodic correction coefficient kP at the time (Cmin) when the deviation DEV becomes maximum at the retarded side.

Figure 13:
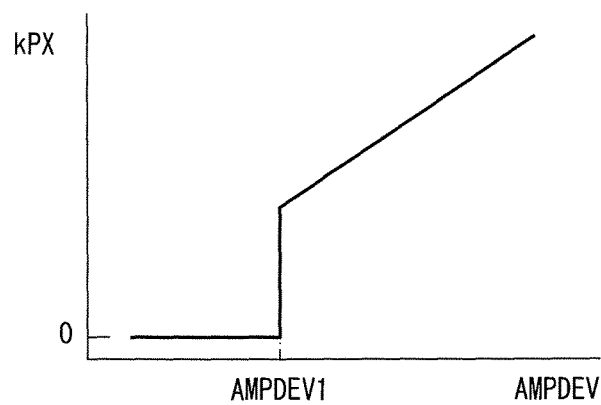
FIG. 13 is a view showing a map of a correction value kPX.

In this case, the periodic correction coefficient kP, as shown in FIG. 13, is set to become larger as the amplitude AMPDEV of the deviation DEV becomes larger. The periodic correction coefficient kP is stored as a function of the amplitude AMPDEV of the deviation DEV in the form of a map shown in FIG. 13 in advance in the ROM 32. Note that, in the embodiment according to the present disclosure, as explained above, if the amplitude AMPDEV of the deviation DEV is equal to or smaller than the set amplitude AMPDEV1, correction by the periodic correction coefficient kP is not performed. Therefore, in FIG. 13, the periodic correction coefficient kP is made zero at DEV≤AMPDEV1.

In this way, in the embodiment according to the present disclosure, the periodic correction coefficient kP is made vibrated in accordance with the vibration of the deviation DEV. Further, the periodic correction coefficient kP is set in accordance with the amplitude AMPDEV of the deviation DEV, so the phase of the intake cam 8 deviating from the target phase is more reliably limited.

Note that, in the embodiment according to the present disclosure, each time the internal combustion engine is started up, the periodic correction coefficient kP is set. That is, when the internal combustion engine is stopped or started, the periodic correction coefficient kP is returned once to zero.

Figure 14:
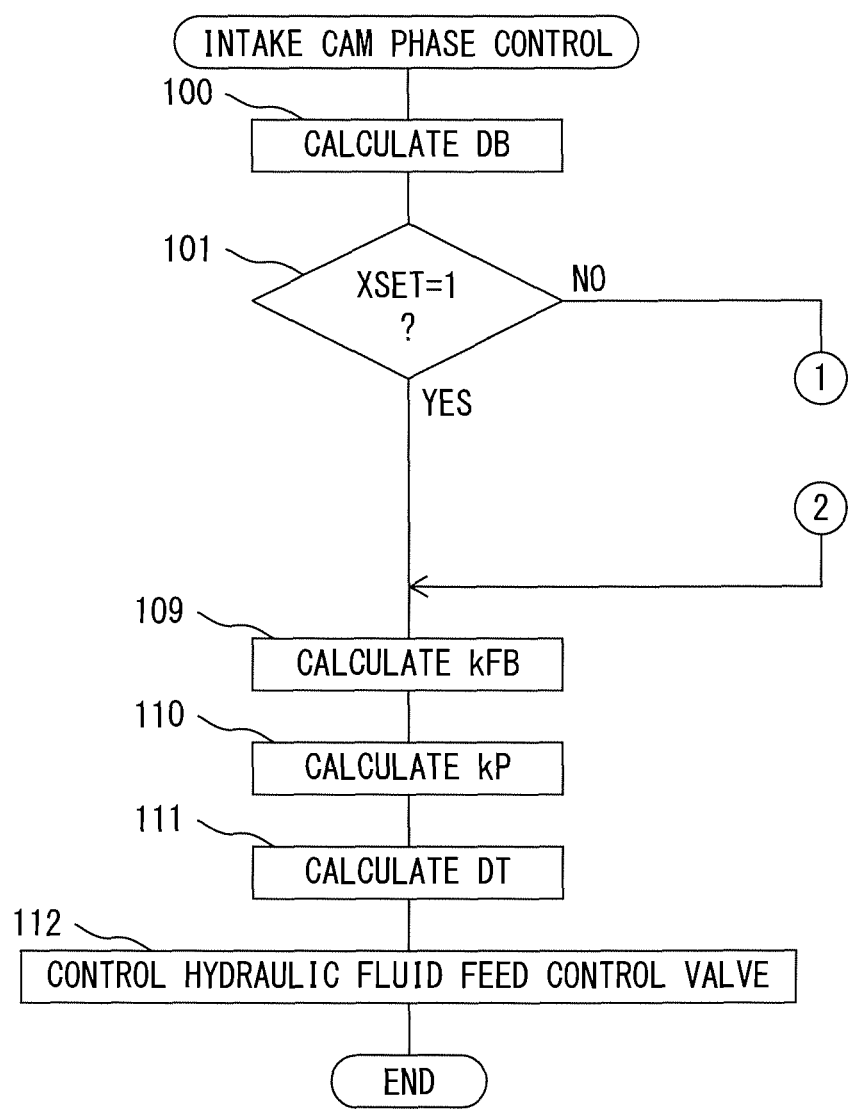
FIG. 14 is a flow chart showing a routine for intake cam phase control.
Figure 15:
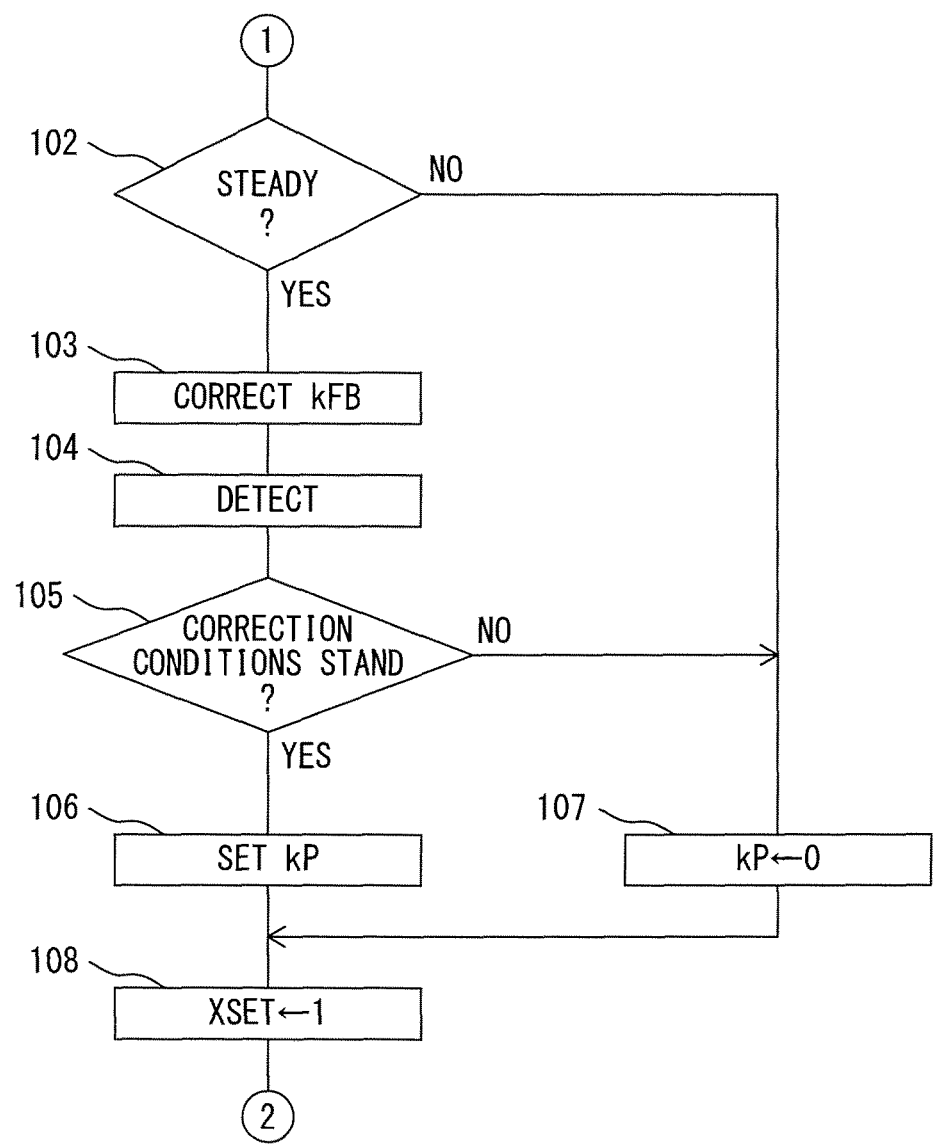
FIG. 15 is a flow chart showing a routine for intake cam phase control.

FIG. 14 and FIG. 15 show a routine for performing the intake cam phase control of the embodiment according to the present disclosure. This routine is performed by interruption every certain time. Referring to FIG. 14 and FIG. 15, at step 100, the base duty ratio DB is calculated from the map of FIG. 8. At the next step 101, it is judged if a flag XSET has been set. The flag XSET is set when a setting of the periodic correction coefficient kP is finished (XSET=1) and is reset when stopping the internal combustion engine or starting it (XSET=0). If the flag XSET is reset, that is, if the periodic correction coefficient kP has not been set yet, the routine proceeds from step 101 to step 102.

Step 102 to step 108 is a part for setting the periodic correction coefficient kP. At step 102, it is judged if the phase of the intake cam 8 or duty ratio DB is in a steady state. If the phase of the intake cam 8 or duty ratio DB is in the steady state, the routine next proceeds to step 103 where the feedback correction coefficient kFB is corrected so that an absolute value of the feedback correction coefficient kFB becomes smaller. That is, corrective action by the feedback correction coefficient kFB is weakened. In this case, the target duty ratio DT is temporarily calculated as a total of the base duty ratio DB and the weakened feedback correction coefficient kFB, and the hydraulic fluid feed control valve 18 is controlled to make the duty ratio D this target duty ratio DT. At the next step 104, the deviation DEV is detected, and the maximum value DEVmax, minimum value DEVmin, and amplitude AMPDEV of the deviation DEV, maximum counter value Cmax and minimum counter value Cmin, and the interval dC are obtained in a plurality of rotational periods PRD and averaged. In this case, detection of the deviation DEV, etc., is performed in a state where the corrective action by the feedback correction coefficient kFB is weakened, so the detection of the deviation DEV, etc., can be performed more accurately. Note that, in another embodiment (not shown), the deviation DEV is detected when the phase of the intake cam 8 is advanced to the maximum extent or is retarded to the maximum extent. Further, in another embodiment (not shown), detection of the deviation DEV, etc., is performed while temporarily changing and maintaining the phase of the intake cam 8 to the most advanced or most retarded state. At the next step 105, it is judged if the above-mentioned correction conditions stand. If the correction conditions stand, the routine proceeds to step 106 where the periodic correction coefficient kP is set. Specifically, the correction value kPX is calculated from the map FIG. 13. The periodic correction coefficient kP is set to the negative correction value (−kPX) during the counter value CNT changes from the maximum counter value Cmax to the minimum counter value Cmin, and is set to the positive correction value (+kPX) during the counter value CNT changes from the minimum counter value Cmin to the maximum counter value Cmax. Next, the routine proceeds to step 108. As opposed to this, if the correction conditions do not stand or if the phase of the intake cam 8 or duty ratio DB is in a transitory state, the routine proceeds from step 102 to step 107. At step 107, the periodic correction coefficient kP is set to zero. Next, the routine proceeds to step 108. At step 108, the flag XSET is set (XSET=1). Next, the routine proceeds to step 109.

If the flag XSET has been set, the routine proceeds from step 101 to step 109. At step 109, the feedback correction coefficient kFB is calculated. At the next step 110, the periodic correction coefficient kP is calculated based on the current counter value CNT. At the next step 111, equation (1) is used to calculate the target duty ratio DT. At the next step 112, the hydraulic fluid feed control valve 18 is controlled to make the duty ratio D the target duty ratio DT.

Figure 16:
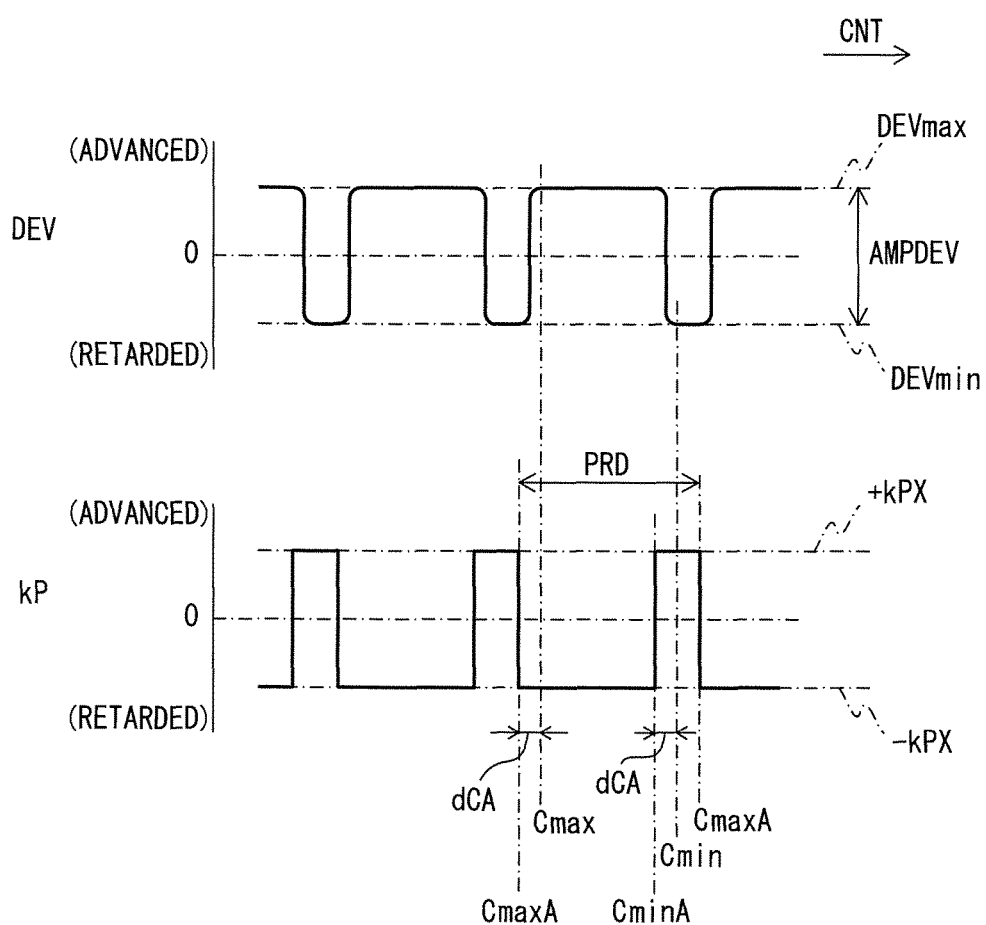
FIG. 16 is a graph showing another example of a change of periodic correction coefficient with respect to a change of counter value.

Next, referring to FIG. 16, another embodiment of the setting of the periodic correction coefficient kP will be explained. In the example shown in FIG. 16, if the counter value CNT becomes a value (=Cmax−dCA) smaller than the maximum counter value Cmax by a predetermined value dCA, that is, slightly before the timing when the deviation DEV becomes the maximum value DEVmax, the periodic correction coefficient kP is made the positive value (kPX) and maintained at the same. Next, if the counter value CNT becomes a value (=Cmin−dCA) smaller than the minimum counter value Cmin by a predetermined value dCA, that is, slightly before the timing when the deviation DEV becomes the minimum value DEVmin, the periodic correction coefficient kP is made the negative value (−kPX) and maintained at the same. These are successively repeated. That is, in the example shown in FIG. 16, the electronic control unit 30 is configured to start to correct the phase of the intake cam 8 to the retarded side by the periodic correction coefficient kP before the time (Cmax) when the deviation DEV becomes maximum at the advanced side and to start to correct the phase of the intake cam 8 to the advanced side by the periodic correction coefficient kP before the time (Cmin) when the deviation DEV becomes maximum at the retarded side. According to the above, even if there is a delay in response of the intake variable valve timing mechanism 17, the phase of the intake cam 8 can be more reliably limit from deviating from the target phase. Note that, in the example shown in FIG. 16, the setting dCA is a fixed value. In another embodiment (not shown), the setting dCA is a variable value.

In the embodiments according to the present disclosure explained up to here, the intake variable valve timing mechanism 17 is provided and the opening timing and closing timing of the exhaust valve 4 are maintained. In another embodiment according to the present disclosure (not shown), an exhaust variable valve timing configured to be able to change at least one of an opening timing and closing timing of an exhaust valve 4 by controlling a phase of the exhaust cam 10 is provided and the opening timing and closing timing of the intake valve 3 are maintained. In still another embodiment according to the present disclosure (not shown), an intake variable valve timing mechanism 17 and exhaust variable valve timing mechanism are provided. Therefore, if expressing these embodiments comprehensively, a variable valve timing mechanism configured to be able to change at least one of an opening timing and closing timing of an engine valve by controlling a phase of a cam for driving the engine valve to open and close the engine valve is provided. Note that, the engine valve includes at least one of the intake valve 3 and exhaust valve 4.

According to the present disclosure, it is possible to more reliably limit a phase of a cam, which cam drives an engine valve to open and close the engine valve, from deviating from a target phase.

While the disclosure has been described by reference to specific embodiments chosen for purposes of illustration, it should be apparent that numerous modifications could be made thereto, by those skilled in the art, without departing from the basic concept and scope of the disclosure.

This application claims the benefit of JP Application No. 2016-137546, the entire disclosure of which is incorporated by reference herein.

What is claimed is:

1. A control system for an internal combustion engine comprising:
   a crankshaft;
   a camshaft provided with a cam for driving an engine valve to open and close the engine valve;
   a timing chain for transmitting rotation of the crankshaft to the camshaft;
   a variable valve timing mechanism configured to be able to change at least one of an opening timing and closing timing of the engine valve by controlling a phase of the cam; and
   an electronic control unit configured to set in advance a periodic correction coefficient to vibrate by a period identical to a rotational period of the timing chain and to control the variable valve timing mechanism by the periodic correction coefficient to make the phase of the cam a target phase.

2. The control system for an internal combustion engine according to claim 1, wherein the control system further comprises a cam phase sensor for detecting a phase of the cam and wherein the electronic control unit is configured to correct the phase of the cam by the periodic correction coefficient if an amplitude of deviation from the target phase of the phase of the cam is larger than a predetermined set amplitude.

3. The control system for an internal combustion engine according to claim 2, wherein the electronic control unit is configured to start to correct the phase of the cam to a retarded side by the periodic correction coefficient at a timing when the deviation of the phase of the cam from the target phase becomes maximum at an advanced side and to start to correct the phase of the cam to the advanced side by the periodic correction coefficient at a timing when the deviation becomes maximum at the retarded side.

4. The control system for an internal combustion engine according to claim 2, wherein the electronic control unit is configured to start to correct the phase of the cam to a retarded side by the periodic correction coefficient before a timing when the deviation of the phase of the cam from the target phase becomes maximum at the advanced side and to start to correct the phase of the cam to the advanced side by the periodic correction coefficient before a timing when the deviation becomes maximum at the retarded side.

5. The control system for an internal combustion engine according to claim 1, wherein the electronic control unit is configured to start to correct the phase of the cam to a retarded side by the periodic correction coefficient at a timing when a deviation of the phase of the cam from the target phase becomes maximum at an advanced side and to start to correct the phase of the cam to the advanced side by the periodic correction coefficient at a timing when the deviation becomes maximum at the retarded side.

6. The control system for an internal combustion engine according to claim 1, wherein the electronic control unit is configured to start to correct the phase of the cam to a retarded side by the periodic correction coefficient before a timing when a deviation of the phase of the cam from the target phase becomes maximum at the advanced side and to start to correct the phase of the cam to the advanced side by the periodic correction coefficient before a timing when the deviation becomes maximum at the retarded side.

7. The control system for an internal combustion engine according to claim 1, wherein an amplitude of the periodic correction coefficient is set larger as a deviation of the phase of the cam from the target phase becomes larger.

8. The control system for an internal combustion engine according to claim 1, wherein the engine valve is an intake valve.

9. A method of controlling an internal combustion engine, the engine including:
  a crankshaft;
  a camshaft provided with a cam for driving an engine valve to open and close the engine valve;
  a timing chain for transmitting rotation of the crankshaft to the camshaft;
  a variable valve timing mechanism configured to be able to change at least one of an opening timing and closing timing of the engine valve by controlling a phase of the cam; and
  an electronic control unit,
  the method comprising:
  setting in advance using the electronic control unit a periodic correction coefficient to vibrate by a period identical to a rotational period of the timing chain; and
  controlling using the electronic control unit the variable valve timing mechanism by the periodic correction coefficient to make the phase of the cam a target phase.

* * * * *